Feb. 10, 1948. E. H. LAND 2,435,719
PHOTOGRAPHIC APPARATUS FOR SUBJECTING A PHOTOGRAPHIC
FILM TO A PROCESSING FLUID
Filed Feb. 12, 1946 2 Sheets-Sheet 1

INVENTOR.
Edwin H. Land
BY Donald C. Brown
Attorney

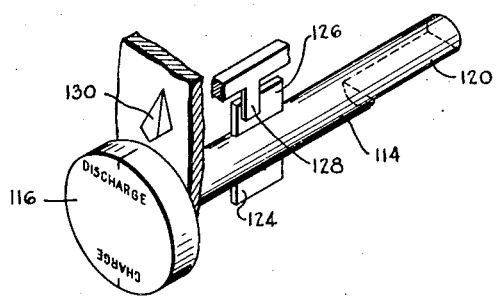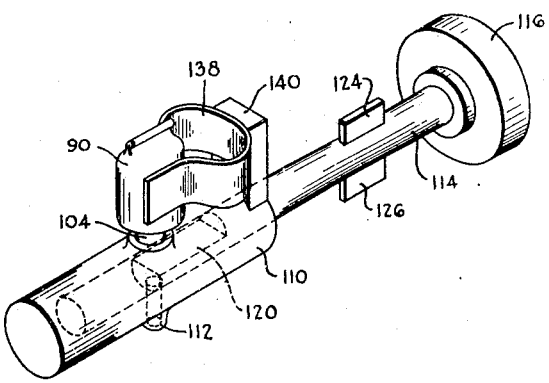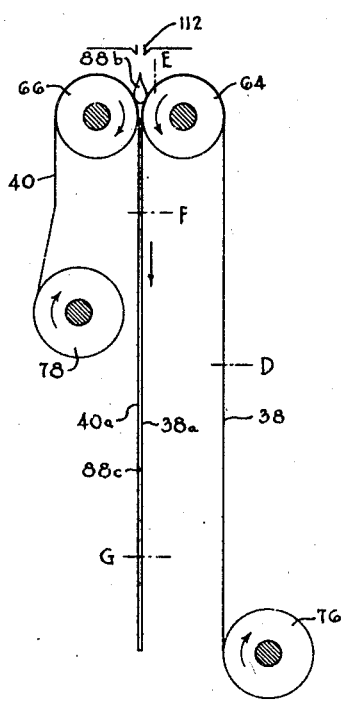

Patented Feb. 10, 1948

2,435,719

UNITED STATES PATENT OFFICE 2,435,719

PHOTOGRAPHIC APPARATUS FOR SUBJECTING A PHOTOGRAPHIC FILM TO A PROCESSING FLUID

Edwin H. Land, Cambridge, Mass., assignor to Polaroid Corporation, Cambridge, Mass., a corporation of Delaware Application February 12, 1946, Serial No. 647,121

19 Claims. (Cl. 95—13)

This invention relates to photography and more particularly to camera apparatus.

This application is a continuation-in-part of my copending application Serial No. 576,254, filed February 5, 1945, for Photographic process, apparatus, and product.

One object of the present invention is to provide novel apparatus for forming a positive print of the subject image of a photographically exposed film.

Another object of the present invention is to provide novel apparatus wherein a releasably-contained liquid, suitable for use in processing a photographically exposed film and in forming a positive print of the subject image of said film, may be predeterminedly released to said film and to a material for carrying said print.

A further object of the present invention is to provide novel apparatus wherein a measured quantity of a releasably-contained liquid, suitable for use in processing a photographically exposed film and in forming a positive print of the subject image of said film, may be predeterminedly released between said film and a material for carrying said print, and wherein said film and print-carrier materials may be compressed for predeterminedly spreading said liquid over said materials for forming said print.

Still another object of the present invention is to provide camera apparatus wherein: A photosensitive film is supplied, said photosensitive film may be photographically exposed, a material for carrying a positive print of the subject image of said film is supplied, a liquid suitable for use in processing said film and in forming said print is releasably-contained, a measured quantity of said liquid may be dispensed between predetermined portions of said film and print-carrier material, and wherein said film and print-carrier materials may be compressed for predeterminedly spreading said liquid over said materials and for laminating said materials.

A still further object of the present invention is to provide novel apparatus adapted to serve as an attachment mounted on a conventional camera and interchangeable with the camera back, or as a unitary apparatus mounted in a photographic dark-room, said apparatus embodying means for forming a positive print of the subject image of a photographically exposed film.

Yet another object of the present invention is to provide apparatus comprising means for releasably containing a viscous liquid, and for releasing and spreading said liquid upon a photographically exposed area of a photosensitive film to develop said film, provide an image-forming component therein, and transport said component to a material compressed with said film for forming therein a positive print of the subject image of said exposed film.

Yet another object of the present invention is to provide a novel camera apparatus wherein: a film material comprising a plurality of photosensitive areas may be exposed, a material for carrying a plurality of positive prints of subject images of said exposed film may be supplied, a liquid for processing said film and forming said prints may be releasably contained, and wherein said liquid may be released between said film and print-carrier materials and spread over predetermined portions of said materials for formation of said plurality of positive prints.

Still further objects of the present invention are the provision: of a camera apparatus comprising a plurality of light-tight chambers for photographically exposing a photosensitive film and forming a positive print of the subject image of said exposed film, said chambers having access means for insertion or removal of said film and a material for carrying said positive print; of cutting means for severing predetermined lengths of said film and print-carrier material in operational assembly; of means for dispensing a measured quantity of said liquid to said film and print-carrier material; of means for compressing and propelling said materials; and of means for actuating the movement of the aforesaid severance means, liquid-dispensing means, and compressive and propulsive means.

These and further objects of the invention will in part be obvious and will in part appear hereinafter.

The invention accordingly comprises the apparatus possessing the construction, combination of elements, and arrangement of parts which are exemplified in the apparatus hereinafter described, and the scope of the application of which will be indicated in the claims:

In the drawings, wherein like reference characters refer to like parts throughout the several views:

Fig. 2 is a perspective view of a plunger element and control means therefor employed in mechanism of Fig. 1;

Fig. 3 is an enlarged perspective view of a modification of liquid-dispensing means shown in Fig. 1; and Fig. 4 is a somewhat schematic, fragmentary view of elements in Fig. 1, showing the function of said elements during operation of the apparatus.

Figure 1:
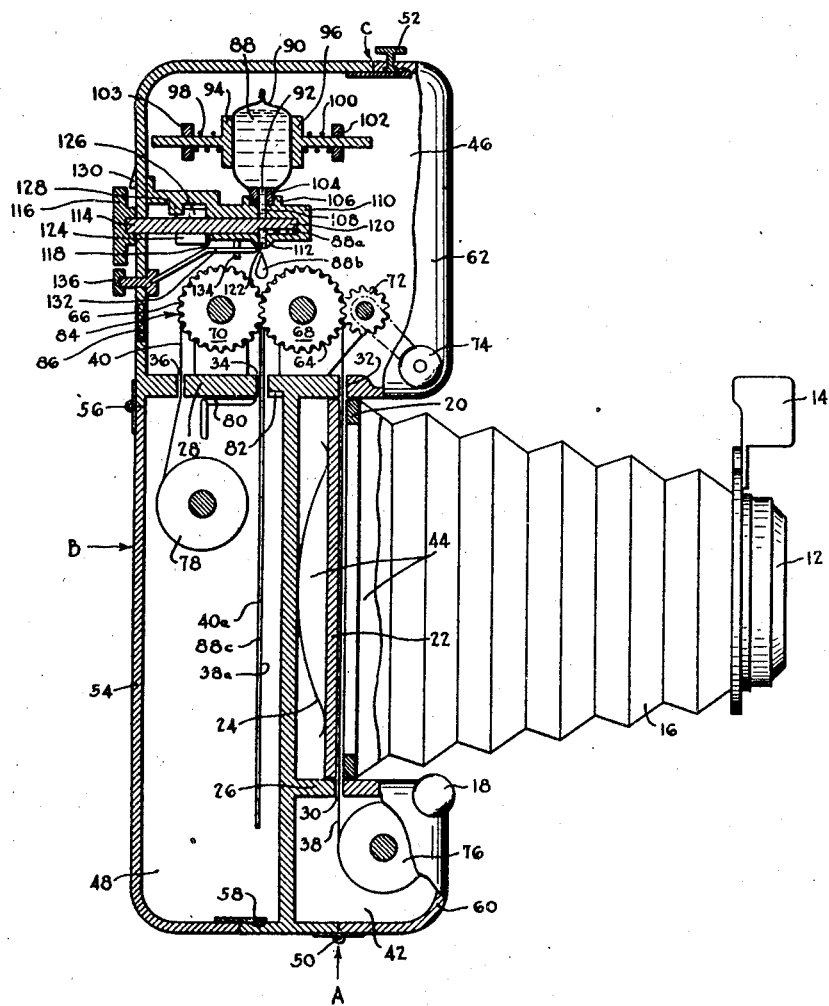
Figure 1 is an elevation view, partly in cross-section and with portions broken away, of one form of the novel camera apparatus of the invention.

Referring to Fig. 1, a camera apparatus is shown comprising both conventional elements for photographic exposure of a photosensitive film and novel elements of the invention, in operative relationship, said apparatus being designed for forming a positive print of a subject image to which said film may be exposed through a process comprising the release of a suitable liquid between said film and a carrying material for said positive print, and the spreading of said liquid over facing surfaces thereof and lamination of said surfaces by compressive means. Camera elements shown comprise lens and shutter 12, view finder 14, bellows 16, shutter release 18, framing plate 20, pressure plate 22 and pressure plate spring 24. A camera housing, suitable for supporting and enclosing the apparatus and for controlling the admittance or exclusion of actinic light to photosensitive film material, preferably comprises a plurality of external and internal walls, forming a plurality of light-tight chambers, said internal walls 26 and 28 having a plurality of apertures 30, 32, 34, and 36 extending therethrough for providing passages and guide means for the movement, within and between said chambers, of a photographic film 38 and a carrier or receiving layer for the aforesaid positive print, as, for example, a paper strip material 40, said apertures being provided with suitable light-shielding means as, for example, strips of a suitable fabric material, not shown, mounted adjacent said apertures. Within said chambers 42, 44, 46 and 48 may be performed the several stages of a photographic process comprising the supplying and photographic exposure of a photosensitive film and the formation of a positive print of the subject image of said exposed film, the aforesaid chambers being provided with access means for inserting, removing or threading the film and other materials used in said camera apparatus, and chamber 46 containing in large part the novel apparatus of this invention. Access to chambers 42, 44, and 46 is obtained by swinging open external wall portions A, B, and C, as a unit, including all elements in chambers 46 and 48 and elements 22 and 24 in chamber 44, said wall portions pivoting on hinge 50 and the aforesaid movement being rendered possible by release of latch knob 52; access to chamber 48 is obtained by swinging open door 54 on hinge 56, said movement being rendered possible by release of friction latch 58. Housing portions 60 and 62 are rigidly interconnected by external wall portions, not shown, and by framing plate 20, extending therebetween, said housing portions 60 and 62 providing both external wall portions for the aforesaid light-tight chambers and support means for mounting camera bellows 16, shutter release 18, and a supply of film 38.

Within chamber 46 is mounted a pair of pressure rollers 64 and 66 having surfacing preferably of a suitable resilient material, the axes of said rollers lying in a substantially horizontal plane, and said rollers having rotative means comprising mutually engaged gears 68 and 70, pinion gear 72 and handcrank 74, the shaft bearing said pinion gear and handcrank preferably having unidirectional means for clockwise rotation, not shown, associated therewith. Mounted in chamber 42 is a spool 76 carrying a supply of photographic film 38, said film being led from spool 76, threaded across the aperture of framing plate 20, substantially half-around pressure roller 64, and passing into chamber 48. Mounted in chamber 48 is a spool 78 carrying a supply of a paper or other material 40 suitable for carrying, receiving, or serving as a base for a positive photographic print, said strip of paper being led from spool 78 into chamber 46, threaded substantially half-around pressure roller 66, and returned to chamber 48. Adjacent aperture 34 is positioned a cutting device for severing lengths of said film and paper material after the passage of said materials through said aperture into chamber 48, said device comprising movable blade and handle 80 and fixed blade 82, said movable blade being pivotally mounted adjacent one extremity thereof on wall 28 and being thus capable of effecting transverse severance of said film and paper materials upon their passage through aperture 34 into chamber 48.

It will be understood that operative movement of the aforesaid film and paper strip is actuated by rotation of handcrank 74 and pinion gear 72 in a clockwise direction, said rotation causing pressure roller gears 68 and 70 and associated pressure rollers 64 and 66 to rotate in counterclockwise and clockwise directions, respectively. Suitable indicia for indicating the positioning of a frame of film for photographic exposure across framing plate 20, may be printed, during manufacture, on a surface of paper material 40 and, assuming said indicia to be spaced at intervals of said paper strip equal to intervals between said photographically exposable frames of film, and said film and paper material to be threaded in the camera apparatus in correct interrelationship by means of suitable leaders attached thereto, the aforesaid indicia when arriving at position 84 by means of the aforesaid rotation of handcrank 74 may be observed through viewing window 86, said window preferably having a mark etched thereon for the purpose of obtaining alignment and, accordingly, positioning of the film for exposure, as above described, may be ascertained thereby.

Film and paper strip materials, in passing between pressure rollers 64 and 66, are suitably disposed for the introduction therebetween of a liquid, as, for example, a viscous liquid comprising a photographic reagent capable both of permeating and reacting upon said film to develop a latent negative photographic image and produce an image-forming component therein, and of transporting said image-forming component to said paper material for production of a positive print therein and/or thereupon. The aforesaid pressure rollers, in addition to performing the hereinbefore-described function of propelling the film and paper material, are adapted to compress said materials and, by means of said compression, to spread the aforementioned liquid in a substantially constant thickness over both the photographically exposed frame of film and a similar area of the facing print-carrier material. In Fig. 1 the aforesaid viscous liquid 88 is releasably supplied from a deformable tube-like container 90 constructed, for example, of a pliable metal such as lead and preferably having an inner surface coating of a substance for keeping said liquid out of direct contact with said container material as, for example, a coating of a polyvinyl acetal such as polyvinyl butyral, said liquid being preferably initially hermetically sealed within said container tube. The form of container shown is of a type which may be removably mounted in operative assembly with other elements of the apparatus by the engagement of threaded portions shown, as, for example, said container may be inserted when charged with said liquid, or removed when exhausted. In mounting said container, a membrane, not shown, of said coated lead material for forming said hermetic seal across container orifice 92 may be punctured as by means of a prong-like element, not shown, of a substantially lesser diameter than said orifice, adapted to enter said orifice during said container mounting procedure. Compressive elements 94 and 96, under tension of springs 98 and 100 and having mounting means, 102 and 103, for permitting convergent movement thereof with respect to the container for applying compression to said container and forcing said liquid therefrom, may be separated manually for placing said container in operative position therebetween.

Attached to a wall of chamber 46 and positioned beneath container compressive means 94 and 96 is a measuring pump suitable for receiving predetermined quantities of a viscous liquid from the compressed container and for delivering predetermined quantities of said liquid to film 38 and print-carrier material 40. The container is attached to said measuring pump as, for example, by engaging threaded outlet member 104 thereof with threaded inlet member 106 of the measuring pump and thereby joining orifice 92 of the container with orifice 108 of the measuring pump to provide a substantialy unitary passage for flow of the aforementioned liquid. The form of measuring pump shown comprises a cylinder 110 having aforementioned inlet member 106, and outlet member 112 for receiving and dispensing, respectively, said liquid. In contact with chamber wall portions of said cylinder, and capable both of predetermined longitudinal and rotative movement therein, is mounted a plunger 114 for controlling and actuating flow of the aforesaid liquid, said plunger being manually operated by knob 116 to provide functional movements thereof of forward thrust, rotation, and withdrawal. A fluid seal, not shown, for preventing escape of said liquid between plunger and cylinder may be positioned within said cylinder chamber adjacent portion 118 thereof. The forward or inner portions of the plunger are in the form of a segment 120, the chord of said segment being radially spaced from the axis of said plunger, and the length of said segmented portion being predetermined with respect to the maximum length of travel of said plunger longitudinal of the cylinder chamber. The aforesaid segment portion provides valve means both for admitting liquid to the cylinder as, for example, when said segment is removed from inlet orifice 108, and for releasing said liquid from the cylinder when said segment is removed from outlet orifice 122, said last-named orifice being formed by the aforesaid outlet member 112 and said last-named position of the segment for ejection of the liquid from the cylinder being that illustrated in Fig. 1. Accordingly, when the aforesaid segment is removed from a given orifice, a clear passage for the flow of liquid through said orifice is provided, it being understood that removal of the segment from a given orifice positions said segment adjacent the other orifice and provides a closure therefor, the aforesaid design of said segment preventing simultaneous opening of portions of both orifices. It will be apparent that variance in position of plunger segment 120 with respect to said orifices is caused by rotation of the plunger. Positive positioning of the segment adjacent each orifice is obtained by two vane-like members 124 and 126 mounted a predetermined distance apart on the periphery of the plunger, said members being thus mounted on a portion of said plunger extending beyond the cylinder walls, as shown, and being so positioned on said plunger periphery as to strike a stop 128 when the plunger is rotated substantially 180°. Vane 124 strikes stop 128 when segment 120 is removed from inlet orifice 108 and vane 126 strikes said stop when the aforesaid segment is removed from outlet orifice 122, said movement of the vanes to stop limits being actuated by a half-turn of knob 116 and a reverse half-turn of said knob to its original position. It is to be noted that the vanes are of sufficient length and so positioned as to maintain their contact with stop 128 during movement of the plunger longitudinally of the axis of the cylinder chamber, said length of the vanes being at least equal to that distance which the plunger thus travels during thrust or withdrawal thereof. In Fig. 1, the knob has been turned in a clockwise direction, bringing vane 126 against stop 128 and permitting flow of the liquid through orifice 122 as above described. To close said orifice and permit flow of said liquid through inlet orifice 108, the knob is turned in a counterclockwise direction until vane 124 strikes stop limit 128.

The position of the plunger segment and vanes and the movement of liquid shown in Fig. 1 illustrate the relative disposition of said elements which would prevail immediately upon completion of a maximum forward thrust of the plunger for ejection of the liquid, said position of maximum forward thrust being determined by suitable stop means as, for example, by the contact of a portion of knob 116 with the wall of chamber 46. Assuming the chamber of cylinder 110 to have been initially charged with a quantity of liquid supplied from container 90, a portion of said liquid, 88b, has been ejected from said cylinder chamber and is shown in the process of dispensal substantially between surfaces of film 38 and print-carrier material 40, it being understood, as previously described, that the leading edge of a photographically exposed frame of said film is in a position on the surfacing of pressure roller 64 which will insure its passing between the pressure rollers immediately following introduction of the liquid to said film and print-carrier material. During depression of said plunger, the camera apparatus is preferably held in the substantially vertical position shown to insure that dispensed liquid 88b will properly contact said film portion. Correct position of the film with respect to actuating dispensal of said liquid may be rendered apparent to the operator by the positioning of indicia for the purpose, carried on print-carrier material 40, said indicia being visible through viewing window 86. It will be noted that a small portion of said liquid 88a remains within the chamber of cylinder 110, said liquid being thus retained within said chamber due to the absence of a force for expulsion thereof. The quantity of liquid 88b dispensed to film and print-carrier material and the form in which it is thus dispensed is predetermined according to the extent and dimensions of the surface areas of said materials to be covered thereby during the aforesaid liquid-spreading process, said predetermined quantity and form of the dispensed liquid being obtained by a design of the measuring pump which is based upon calculated factors comprising dimensions of the pump cylinder, dimensions of inlet and outlet orifices, form of the outlet orifice, length of plunger thrust, and viscosity of liquid to be measured and ejected. If the film and print-carrier material are of a considerable width, a plurality of interconnected measuring pumps operable by single plunger means could be disposed transverse of said materials for simultaneous dispensal of a liquid substantially across the breadth thereof.

Upon completion of the forward thrust of plunger 114 for ejection of liquid 88b, said plunger is rotated one-half turn, as previously described, thus sealing outlet orifice 122 and opening inlet orifice 108. In said position the plunger may be regarded as idle or in readiness for withdrawal from the cylinder for receiving a further charge of liquid into said cylinder chamber. Withdrawal of the plunger is limited by suitable stop means, as, for example, by the contact of edges of vanes 124 and 126 with the wall of chamber 46. Said withdrawal of the plunger provides an area of said cylinder chamber for receiving a supply of liquid from container 90, introduction of said liquid to the cylinder being effected through the aforementioned compression applied to the container by elements 94 and 96 and/or by aspirational action of the plunger and cylinder. It is to be noted that said last-named action may be sufficient for charging the cylinder with a liquid supplied from a container and, accordingly, a compressible container and means for applying compression thereto may be obviated thus permitting use in the present invention of a liquid container or reservoir of a construction modified from that shown and having no compressive means associated therewith. Upon withdrawal of the plunger to the aforementioned stop limit said plunger is rotated, as above-described, for ejection of liquid from the cylinder and is in correct position for actuating a further dispensal of said liquid to the film and print-carrier material.

As illustrated in Fig. 2 correct rotative position of plunger 114 for depression or withdrawal thereof may be ascertained by indicia for the purpose as, for example, by two marks oppositely positioned on the face and periphery of knob 116, said marks being designated "charge" and "discharge" respectively, and by the bringing of the aforesaid marks to a fixed index 130, positioned on the housing, said arrangement of fixed and rotatable indicia being similar to the relative positioning of fixed stop 128 and rotatable vanes 124 and 126, and of rotatable plunger segment 120 with respect to fixed inlet and outlet orifices. It will be apparent that means for locking the plunger against forward thrust or withdrawal, excepting at correct rotative positions, or means for automatically rotating the plunger upon completing the depression thereof and for reversely rotating said plunger at a position of extreme withdrawal thereof may be embodied in the measuring pump, said means comprising obvious possible modifications. It may be noted in Fig. 1 that while rotation of plunger 114, upon completion of the operation of depressing said plunger, provides a closure of orifice 122, it may be desirable both to remove any excess of the aforesaid liquid which might tend to accumulate on the outer portions of outlet or vent member 112 and to provide a seal for such liquid as may be retained in said orifice when the apparatus is not in use to prevent hardening thereof. A spring member 132 capable of longitudinal movement in guide 134 and actuated to thus move by knob and shaft 136 to which said spring member is attached, may be provided for the aforementioned purposes, said knob and shaft being capable of movement transversely through the housing of chamber 46 and portions of said spring member adjacent orifice 122 being adapted to the aforementioned functions of removal of excess liquid and sealing of said orifice.

In Fig. 3 an enlarged view of the measuring pump and liquid supply means 86 of Fig. 1 embodying a slight modification of compressive means therefor are shown, said last-named means comprising a C spring 138 and mounting means 140 for said spring attached to pump cylinder 110. As illustrated, plunger 114 is at a rotative position for introduction of a liquid to the cylinder chamber, segment 120, accordingly, being removed from the inlet orifice and adjacent the outlet orifice and vane 124 being in position for contact with the stop limit 128 shown in Fig. 1. Fig. 4 illustrates, somewhat schematically, elements of Fig. 1 related to the movement and compression of a photographically exposed film and a print-carrier material, said apparatus elements thereof being represented while undergoing rotary movement, as by reason of the clockwise rotation of handcrank 14 of Fig. 1, said operations being accompanied by movement both of film 38 and paper strip 40 from supply spools 76 and 78, respectively, to pressure rollers 64 and 66, and by compression of said materials between said rollers. Portion D, E of film 38 represents a photographically exposed frame thereof in movement, the emulsion bearing surface of said portion and a similarly dimensioned surface portion of paper strip 40 being shown as moving toward a facing relationship and undergoing reception of a measured quantity of viscous liquid, 88b, dispensed from outlet member 112 of the measuring pump as above described. The quantity of liquid 88b introduced to the film and print-carrier material is predetermined with respect to surface areas of said materials requiring coverage, it being understood that the compressive properties of pressure rollers 64 and 66 are necessarily also to be considered relative to covering said surface areas and obtaining a liquid coating therebetween of correct thickness. Portion F, G of said substantially laminated materials comprises film 38a and paper material 40a, said materials having previously passed between the pressure rollers and having had a measured quantity of liquid, 88c, introduced thereto and spread in the form of a coating therebetween, by the compressive and propulsive properties of said rollers.

Cross-referring to Figs. 1 and 4, it will be noted that the position of laminated film 38a and paper strip 40a is substantially within chamber 48, said chamber providing a light-tight enclosure wherein the process of positive print-formation may occur. Door 54 provides access means to said chamber for use upon completion of said print-forming process whereby severance of lengths of said laminated materials by means of cutting blades 80 and 82 and removal of said severed materials from said chamber for the purpose of viewing a positive print formed within said materials may be performed. Means, not shown, comprising a time-delay device associated with a modification of latch 58 could be embodied in the apparatus for controlling the opening of said door 54 for removal of said severed lengths of materials when the positive print is completed. It is to be understood that means for determining proper position of the film and paper strip for severance thereof are provided, said means comprising, for example, either indicia solely for the purpose printed on strip 40 and visible through viewing window 86, or a design of propulsive elements of the apparatus such that when a given frame of film is in position for exposure, another preceding frame of said film, previously exposed and laminated to the print-carrier material is automatically in position for severance, in which last-named instance a single index could serve for establishing correct positions of both film portions simultaneously. It is further to be understood that movable cutting blade 80 may have a handle portion extending through the outer housing of the camera whereby access to chamber 48 is not required for cutting the laminated strip materials, or that a movable blade may be operatively connected to pressure roller driving means whereby said blade automatically severs said laminated materials at predetermined intervals.

In the process of positive print formation illustrated in Figs. 1 and 4, film 38a and print-carrier 40a, interposed by liquid 88c, are shown in operational assembly therefor. Relative to said process of forming a positive print, it is required that said assembly be maintained for at least a predetermined period of time and that during said period actinic light be prevented from striking photosensitive materials as, for example, the film emulsion. Upon completion of the positive print, film and print-receiving layer materials may be stripped apart for viewing said print. Light-tight chamber 48 wherein said materials may be retained during at least said period of required assembly provides one means for the purpose but alternate means for protectively enclosing said photosensitive materials may be utilized, said means permitting a reduction in number of the plurality of light-tight chambers illustrated in the drawings, and comprising, for example, the provision of an opaque receiving or carrier material for the positive print and an opaque backing material for the photosensitive film whereby actinic light may be prevented from striking said film and whereby said materials, in operational assembly and in properly severed lengths may be emitted directly from the camera apparatus and subsequently stripped apart for viewing the completed print.

While the camera apparatus shown in the drawings represents an inclusive apparatus for performing the functions of exposing a photosensitive film to a subject image and for forming a positive print of said subject image, it is to be understood that elements of the apparatus more particularly serving said positive print-forming function may be housed in the form of an attachment, interchangeable with the back of a conventional camera, or that said elements may be suitably mounted, apart from the camera, in a photographic dark-room for use in conjunction with a photographically exposed film. It is further to be understood that the measuring pump illustrated or a modification of said means for dispensing a liquid to the film and print-carrier material may have associated means for automatically actuating movement of the plunger element or a modified dispensal element thereof as, for example, means associated with the driving mechanism of the pressure rollers and so cooperating with said mechanism as to cause said movement of the plunger at predetermined intervals, said intervals bearing a specified relationship to the passage of photographically exposed frames of film between the pressure rollers. A further modification would permit the operative association of liquid dispensal means and shutter release.

Where the liquid employed is of a substantially non-viscous composition, a measuring pump having plunger or other suitable means for ejection of the liquid may not be required for said liquid ejection and said means may be supplanted by valve means, only, for releasing predetermined quantities of said liquid. Operation of the apparatus is not restricted to compressive and propulsive means of the type shown, it being apparent that other means than those illustrated could serve a similar function. Possible modifications of apparatus for propelling and compressing the aforesaid materials comprise a plurality of endless belts capable of applying compression and propulsion between their surfaces. Separate elements for applying compression to the film and print-carrier material may be used in conjunction with propulsive means as, for example, individual pairs of pressure rollers for each function or wedge- or segment-like elements, or pressure plate means operatively synchronized with said propulsive means. Where pressure roller or other of the above-mentioned means are employed, operation thereof is not necessarily limited to manually applied power. The rollers of Figs. 1 and 4 and an associated form of measuring pump embodied in the apparatus may be power driven as, for example, by a spring motor having releasable detent means for applying power and for controlling the duration of said applied power. While the type of film utilized in conjunction with the apparatus of this invention is shown to be roll film, it is to be understood that means for dispensal of a liquid to predetermined portions of a photosensitive film and a print-carrier material and compressive and propulsive means substantially similar to those shown could be adapted to use with cut film supplied, for example, from a film pack.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. Photographic apparatus for processing a photographically exposed light-sensitive film material comprising, in combination, pressure applying means between portions of which said film and another sheet material are adapted to be positioned, in superposed relationship, and subjected to compression, means comprising a fluid dispenser for releasably holding, out of contact with said materials, a supply of film processing fluid sufficient for processing a plurality of frames of exposed film and for intermittently dispensing predetermined quantities of said fluid to said materials, each of said quantities being adapted to perform the processing of a single frame of film, said dispenser being adapted to dispense a quantity of said fluid of suitable form for contact with an area of said sheet materials which is smaller than the area of said frame of film ultimately to be covered by said quantity of fluid, means for mounting said fluid holding and dispensing means relative to said pressure applying means so that said dispenser is positioned adjacent said pressure applying means and said fluid is thereby adapted to substantially direct movement toward said pressure applying means and to contact at least one of said materials, and means for positioning said materials relative to said pressure applying means so that portions of said materials, adjacent other portions held in face-to-face contact by said pressure applying means, are maintained in spaced relation to one another prior to compression thereof, said spaced portions being adapted to receive said predetermined quantity of fluid therebetween from said fluid dispenser and to be compressed, said pressure applying means providing spreading of said fluid between and in contact with interface areas of said materials.

2. Photographic apparatus for processing a photographically exposed light-sensitive film material comprising, in combination, pressure applying means between portions of which said film and another sheet material are adapted to be positioned, in superposed relationship, and subjected to compression, means comprising a fluid dispenser for releasably holding, out of contact with said materials, a supply of film processing fluid sufficient for processing a plurality of frames of exposed film and for intermittently dispensing predetermined quantities of said fluid to said materials, each of said quantities being adapted to processing of a single frame of film, said dispenser being provided with outlet means adapted to limit the cross-sectional dimensions of said quantity of fluid issuing therefrom to substantially the cross-sectional dimensions of said outlet means, so that each of said predetermined quantities of fluid may be brought in contact with an area of said sheet materials which is smaller than the area of said materials ultimately to be covered by said quantity of fluid, and means for positioning said materials relative to said pressure applying means so that portions of said materials, adjacent other portions positioned in face-to-face contact contiguous said pressure applying means, are maintained in spaced relation to one another prior to compression thereof, said spaced portions being adapted to receive said dimensionally limited quantity of fluid therebetween from said fluid dispenser and to be compressed, said pressure applying means providing spreading of said fluid between and in contact with interface areas of said materials.

3. Photographic apparatus for processing a photographically exposed light-sensitive film material comprising, in combination, pressure applying means between portions of which said film and another sheet material are adapted to be positioned, in superposed relationship, and subjected to compression, means comprising a fluid dispenser for releasably holding, out of contact with said materials, a supply of film processing fluid sufficient for processing a plurality of frames of exposed film and for intermittently dispensing predetermined quantities of said fluid to said materials, each of said quantities being adapted to processing of a single frame of film, said dispenser being provided with outlet means of suitable form and dimensions for limiting the cross-sectional dimensions of said quantity of fluid issuing therefrom, so that each of said predetermined quantities of fluid may be brought in contact with an area of said sheet materials which is smaller than the area of said frame of film ultimately to be covered by said quantity of fluid, means for mounting said pressure applying means relative to said outlet so that said outlet is positioned adjacent said pressure applying means and said fluid is thereby adapted to substantially direct movement toward said pressure applying means and to contact at least one of said materials, and means for positioning said materials relative to said pressure applying means so that portions of said materials, adjacent other portions held in face-to-face contact by said pressure applying means, are maintained in spaced relation to one another prior to compression thereof, said spaced portions being adapted to receive said dimensionally limited quantity of fluid therebetween from said fluid dispenser and to be compressed, said pressure applying means providing spreading of said fluid between and in contact with interface areas of said materials.

4. Photographic apparatus for processing a photographically exposed light-sensitive film material comprising, in combination, pressure applying means between portions of which said film and another sheet material are adapted to be positioned, in superposed relationship, and subjected to compression, means comprising a fluid dispenser for releasably holding, out of contact with said materials, a supply of film processing fluid sufficient for processing a plurality of frames of exposed film and for intermittently dispensing predetermined quantities of said fluid to said materials, each of said quantities being adapted to processing of a single frame of film, said dispenser having associated therewith means providing a vent, so dimensioned and formed as to limit the cross-sectional dimensions of said quantity of fluid issuing therefrom, so that each of said predetermined quantities of fluid may be brought in contact with an area of said sheet material which is smaller than the area of said frame of film ultimately to be covered by said quantity of fluid, means for mounting said pressure applying means relative to said vent so that said vent is positioned adjacent said pressure applying means and said fluid is thereby adapted to substantially linear movement toward said pressure applying means and to contact at least one of said materials, and means for mounting a supply of said film material and a supply of said other sheet material with respect to said pressure applying means so that a portion of each of said materials, intervening between each of said mounting means therefor and said pressure applying means, and adjacent said pressure applying means, is maintained in spaced relation to the other portion prior to compression thereof, said spaced portions being adapted to receive said quantity of fluid therebetween from said fluid dispenser and to be compressed, said pressure applying means providing spreading of said fluid between and in contact with interface areas of said materials.

5. Photographic apparatus for processing a photographically exposed light-sensitive film material comprising, in combination, pressure applying means between portions of which said film and another sheet material are adapted to be positioned in superposed relationship, advanced, and subjected to compression, container means for holding, out of contact with said materials, a supply of film processing fluid sufficient for processing a plurality of frames of exposed film, said container comprising an outlet valve and having associated therewith means forming a vent for releasing said fluid to said materials, said vent being so dimensioned and formed as to limit the cross-sectional dimensions of said fluid issuing therefrom and thereby providing contact of said fluid with an area of said sheet materials which is smaller than the area of said frame of film ultimately to be covered thereby, means for actuating said outlet valve, means for supplying a roll of said film comprising a plurality of areas adapted to photographic exposure, means for separately supplying a roll of said other sheet material comprising a plurality of areas coextensive with said areas of film, means for mounting said pressure applying means relative to said vent so that said vent is positioned adjacent said pressure applying means and said fluid is thereby adapted to substantially direct movement toward said pressure applying means and to interposition between said materials engaged thereby, and means for mounting said roll of film material and said roll of other sheet material with respect to said pressure applying means so that a portion of each of said materials, extending between each of said mounting means therefor and said pressure applying means, and adjacent said pressure applying means, is maintained in spaced relation to the other portion, prior to compression thereof, said spaced portions being adapted to receive said fluid therebetween from said vent and to be compressed, said pressure applying means providing distribution of said fluid between and in contact with interface areas of said materials, upon advancement of said materials therebetween.

6. Apparatus for subjecting a photographically exposed photosensitive film material to a predetermined processing comprising, in combination, pressure applying means comprising at least a rotatable member between portions of which said film and another sheet material are adapted to be positioned in superposed relationship, and subjected to compression, means comprising a fluid dispenser for releasably holding, out of contact with said materials, a supply of fluid adapted to process a plurality of frames of exposed film and for intermittently dispensing predetermined quantities of said fluid to said materials, each of said quantities being adapted to processing of a single frame of film, said dispenser being provided with a vent positioned adjacent said pressure applying means, said vent being adapted to have said fluid passed therethrough to said materials and to so control the form of said quantity of fluid issuing therefrom that said quantity of fluid initially covers an area of said materials which is smaller than the area ultimately to be covered thereby, and means for mounting a roll of said film material and for separately mounting a roll of said other sheet material relative to said pressure applying means so that a portion of each of said materials, adjacent other portions held in face-to-face contact between said pressure applying means, is maintained in spaced relation to the other, said spaced portions being adapted to receive said fluid therebetween from said vent and to be compressed, said pressure applying means providing distribution of said fluid between and in contact with interface areas of said materials.

7. Apparatus for subjecting a photographically exposed photosensitive film material to a predetermined processing comprising, in combination, a pair of pressure rollers adapted to position said film and another sheet material therebetween in superposed relationship and to compress and advance said materials, means for actuating said pressure rollers for advance of said materials, means comprising a fluid dispenser for releasably holding, out of contact with said materials, a supply of fluid adapted to process a plurality of frames of exposed film and for intermittently dispensing predetermined quantities of said fluid to said materials, each of said quantities being adapted to processing of a single frame of film, said dispenser being provided with a vent positioned adjacent said pressure rollers, said vent being adapted to have said fluid passed therethrough to said materials and to so control the form of said quantity of fluid issuing therefrom that said quantity of fluid initially covers an area of said materials which is smaller than the area of said frame of film ultimately to be covered thereby, and means for mounting a roll of said film material and for separately mounting a roll of said other sheet material relative to said pressure rollers so that a portion of each of said materials adjacent other portions held in face-to-face contact by said pressure rollers, is maintained in spaced relation to the other, said spaced portions being adapted to receive said fluid therebetween from said vent and to be compressed, said pressure rollers providing distribution of said fluid between and in contact with interface areas of said materials through advancement of said materials therebetween.

8. Apparatus for subjecting a photographically exposed photosensitive film material to a predetermined processing comprising, in combination, a pair of pressure applying members between portions of which said film and another sheet material are adapted to be positioned, in superposed relationship, advanced, and subjected to compression, a fluid container for releasably holding, out of contact with said materials a supply of fluid adapted to process a plurality of frames of exposed film, means coupled with said fluid container for providing intermittent transfer of predetermined quantities of said fluid to portions of said materials positioned adjacent said pressure applying members, each of said quantities being adapted to process a single frame of film and being transferred by said transfer means to an area of said materials which is smaller than the area of said frame of film ultimately to be covered thereby, and means for so mounting a roll of said film material and for so separately mounting a roll of said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

9. Apparatus for subjecting a photographically exposed photosensitive film material to a predetermined processing comprising, in combination, a pair of pressure applying members between portions of which said film and another sheet material are adapted to be positioned, in superposed relationship, advanced, and subjected to compression, a collapsible fluid container for releasably holding, out of contact with said materials, a supply of fluid adapted to process a plurality of frames of exposed film, means associated with said fluid container for expressing said fluid from said container, means coupled with said fluid container for providing intermittent transfer of predetermined quantities of said fluid to portions of said materials positioned adjacent said pressure applying members, each of said quantities being adapted to processing of a single frame of film, and means for so mounting a roll of said film material and for so separately mounting a roll of said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

10. Apparatus for subjecting a photographically exposed photosensitive film material to a predetermined processing comprising, in combination, a pair of pressure applying members between portions of which said film and another sheet material are adapted to be positioned, in superposed relationship, advanced, and subjected to compression, a fluid container for releasably holding, out of contact with said materials, a supply of fluid adapted to process a plurality of frames of exposed film, means for releasably mounting said fluid container within said apparatus, means coupled with said fluid container comprising a measuring pump, said measuring pump being adapted to intermittently transfer predetermined quantities of said fluid to portions of said materials positioned adjacent said pressure applying members, each of said quantities being adapted to processing of a single frame of film, and means for so mounting a roll of said film material and for so separately mounting a roll of said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

11. Apparatus for subjecting a photographically exposed photosensitive film material to a predetermined processing comprising, in combination, a pair of pressure applying members between portions of which said film and another sheet material are adapted to be positioned in superposed relationship, advanced, and subjected to compression, a fluid container for releasably holding, out of contact with said materials, a supply of fluid adapted to process a plurality of frames of exposed film, means coupled with said fluid container and having means providing a vent extending therefrom to a position adjacent said pressure applying members, for providing intermittent transfer of predetermined quantities of said fluid to portions of said materials positioned adjacent said pressure applying members, each of said quantities being adapted to processing of a single frame of film, said vent being formed for transfer of each quantity of fluid to an area of said materials which is smaller than the area ultimately to be covered thereby, means for actuating said fluid transfer means, means comprising a wiper associated with said vent, providing means for removing any excess of said fluid which may accumulate adjacent said vent, means for actuating said wiper means, and means for so mounting a roll of said film material and for so separately mounting a roll of said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

12. Apparatus for subjecting a photographically exposed photosensitive film material to a predetermined processing comprising, in combination, a pair of pressure applying members between portions of which said film and another sheet material are adapted to be positioned, in superposed relationship, advanced, and subjected to compression, a fluid container for releasably holding, out of contact with said materials, a supply of fluid adapted to process a plurality of frames of exposed film, means coupled with said fluid container and having means providing a vent extending therefrom to a position adjacent said pressure applying members, for providing intermittent transfer of predetermined quantities of said fluid to portions of said materials positioned adjacent said pressure applying members, each of said quantities being adapted to processing of a single frame of film, said vent being formed for transfer of each quantity of fluid to an area of said materials which is smaller than the area of said frame of film ultimately to be covered thereby, means for actuating said fluid transfer means, means comprising a bladelike wiper adapted to movement across said vent for removing any excess of said fluid which may accumulate adjacent said vent and for releasably sealing said vent, means for actuating said wiper means, and means for so mounting a roll of said film material and for so separately mounting a roll of said other sheet material relative to said pressure applying members that said materials are adapted to be advanced to face-to-face adjacency between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

13. Camera apparatus for photographically exposing a plurality of frames of photosensitive film material and for subjecting each exposed frame of said film to a predetermined processing comprising, in combination, means for photographically exposing said film material, a pair of pressure applying members between portions of which said film and another sheet material are adapted to be positioned, in superposed relationship, advanced, and subjected to compression, a fluid container for releasably holding, out of contact with said materials, a supply of fluid adapted to process a plurality of frames of exposed film, means coupled with said fluid container for providing intermittent transfer of predetermined quantities of said fluid to portions of said materials positioned adjacent said pressure applying members, each of said quantities being adapted to processing of a single frame of film and formed for initially covering an area of said materials which is smaller than the area ultimately to be covered thereby, and means for so mounting said film material and for so separately mounting said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

14. Camera apparatus for photographically exposing a plurality of frames of photosensitive film material and for subjecting each exposed frame of said film to a predetermined processing comprising, in combination, means for photographically exposing said film material, a pair of pressure applying members between portions of which said film and another sheet material are adapted to be positioned, in superposed relationship, advanced, and subjected to compression, severance means mounted adjacent said pressure applying members for severing predetermined lengths of said compressed materials, a fluid container for releasably holding, out of contact with said materials, a supply of fluid adapted to process a plurality of frames of exposed film, means coupled with said fluid container for providing intermittent transfer of predetermined quantities of said fluid to portions of said materials positioned adjacent said pressure applying members, each of said quantities being adapted to processing of a single frame of film and formed for initially covering an area of said materials which is smaller than the area ultimately to be covered thereby, and means for so mounting a roll of said film material and for so separately mounting a roll of said other sheet material relative to said pressure applying members that said materials are adapted to be advanced to face-to-face adjacency between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

15. Camera apparatus for photographically exposing a plurality of areas of a photosensitive film material and for subjecting each exposed frame of film to a predetermined processing comprising, in combination, casing means for enclosing elements of said apparatus, framing means for releasably holding said film in the focal plane of the camera and for photographically exposing said film, means for mounting a roll of unexposed film material adjacent an extremity of said framing means, means for mounting a roll of another sheet material, adapted to superposition with said exposed film, adjacent an opposite extremity of said framing means, a pair of pressure applying members mounted adjacent said last-named extremity of the framing means, said members being adapted to superpose, compress and permit advancement of said film and other sheet material therebetween, a fluid container for releasably holding, out of contact with said materials, a supply of fluid adapted to process a plurality of frames of exposed film, means coupled with said fluid container for providing intermittent transfer of predetermined quantities of said fluid to portions of said materials positioned adjacent said pressure applying members, each of said quantities being adapted to processing of a single frame of film and formed for initially covering an area of said materials which is smaller than the area ultimately to be covered thereby, means, for actuating said fluid transfer means, and means for so mounting a roll of said film material and for so separately mounting a roll of said other sheet material relative to said pressure applying members that said materials are adapted to be advanced to face-to-face contact between compressive portions of said members in spaced relation to one another, said relative mounting of elements providing spaced areas of said materials for reception of said fluid therebetween, and said pressure applying members being adapted, substantially immediately thereafter, to compress said materials and to spread said fluid between and in contact with interface areas of said materials, upon advancement of said materials between said members.

16. Camera apparatus for photographically exposing a plurality of frames of photosensitive film material and for subjecting each exposed frame of said film to a predetermined processing comprising, in combination, casing means for enclosing elements of said apparatus, framing means for positioning said film for photographic exposure, means for photographically exposing said film, a pair of pressure applying members mounted adjacent that end of said framing means from which said film is adapted to advancement after exposure, said pressure applying members comprising portions between which said film and another sheet material are adapted to be positioned, in superposed relationship, advanced, and subjected to compression, means for mounting a roll of unexposed film adjacent that end of said framing means which is opposite the aforesaid end thereof, means for mounting a roll of said other sheet material adjacent said pressure applying members, means comprising a fluid dispenser normally holding a supply of film processing fluid, sufficient for processing a plurality of frames of exposed film, out of contact with said materials and adapted to dispense predetermined quantities of said fluid to said materials, each of said quantities being adapted to processing of a single frame of film, said dispenser having associated therewith means providing a vent positioned adjacent said pressure applying members for flow of said quantities of fluid therethrough to interface areas of said materials contiguous those areas engaged by said pressure applying members, said vent being formed for controlling the dimensions of said quantity of fluid issuing therefrom so that contact of said fluid with said materials is limited to an area which is smaller than the area of said materials ultimately to be covered by the fluid, when the materials are subjected to said pressure applying members and said fluid is thereby spread between said materials, means for actuating said dispenser means for dispensing said quantities of fluid therefrom, means comprising a web laterally interconnecting portions of said casing and positioned adjacent said pressure applying members mounted within said casing, said web having a light-shielded aperture formed therein through which said materials may be passed after compression thereof by said members, severance means, mounted adjacent said aperture, for severing predetermined lengths of said materials, a second web formed substantially at right angles to and extending between said first-named web and another portion of said casing, said second-named web being positioned rearward of and substantially parallel to the focal plane of the camera, the aforesaid web members, in conjunction with casing portions of the camera, forming a light-tight chamber for holding said compressed materials therewith for a predetermined period, to complete processing of said film, and means providing access to said chamber for removal of said severed materials therefrom.

17. Camera apparatus for photographically exposing a plurality of frames of photosensitive film material and for subjecting each exposed frame of said film to a predetermined processing comprising, in combination, casing means for enclosing elements of said apparatus, framing means for positioning said film for photographic exposure, means for photographically exposing said film, a pair of pressure rollers mounted adjacent that end of said framing means from which said film is adapted to advancement after exposure, said pressure rollers being adapted to superpose said film and another sheet material therebetween and to advance and compress said materials, means for mounting a roll of unexposed film adjacent that end of said framing means which is opposite the aforesaid end thereof, means for mounting a roll of said other sheet material adjacent said pressure rollers, means comprising a fluid dispenser normally holding a supply of film processing fluid, sufficient for processing a plurality of frames of exposed film, out of contact with said materials and adapted to dispense predetermined quantities of said fluid to said materials, each of said quantities being adapted to processing of a single frame of film, said dispenser having associated therewith means providing a vent positioned adjacent said pressure applying members for flow of said quantities of fluid therethrough to interface areas of said materials contiguous those areas engaged by said pressure rollers, said vent being formed for controlling the dimensions of said quantity of fluid issuing therefrom so that contact of said fluid with said materials is limited to an area which is smaller than the area of said materials ultimately to be covered thereby during subjection of the materials to said pressure rollers, means comprising a web laterally interconnecting portions of said casing and positioned adjacent said pressure rollers mounted within said casing, said web having a light-shielded aperture formed therein through which said materials may be passed after compression thereof by said pressure rollers, severance means, mounted adjacent said aperture, for severing predetermined lengths of said materials, a second web formed substantially at right angles to and extending between said first-named web and another portion of said casing, said second-named web being positioned rearward of and substantially parallel to the focal plane of the camera, the aforesaid web members, in conjunction with casing portions of the camera, forming a light-tight chamber for holding said compressed materials therewithin for a predetermined period, to complete processing of said film, and means external of said camera casing for actuating said pressure rollers, said fluid dispenser means, and said severance means.

18. Camera apparatus for photographically exposing a plurality of frames of photosensitive film material and for subjecting each exposed frame of said film to a predetermined processing comprising, in combination, casing means for enclosing elements of said apparatus, framing means for positioning said film for photographic exposure, means for photographically exposing said film, a pair of pressure applying members mounted adjacent that end of said framing means from which said film is adapted to advancement after exposure, said pressure applying members comprising portions between which said film and another sheet material are adapted to be positioned, in superposed relationship, advanced, and subjected to compression, means for mounting a roll of unexposed film adjacent that end of said framing plate which is opposite the aforesaid end thereof, means for mounting a roll of said other sheet material adjacent said pressure applying members, means comprising a fluid dispenser normally holding a supply of film processing fluid, sufficient for processing a plurality of frames of exposed film, out of contact with said materials and adapted to dispense said fluid to said materials, means for actuating said dispenser means for dispensing said fluid therefrom, and means forming a light-tight chamber for holding said compressed materials therewithin for a predetermined period, to complete processing of said film, said last-named means including means providing access to said chamber for removal of materials therefrom.

19. Camera apparatus for photographically exposing a plurality of frames of photosensitive film material and for subjecting each exposed frame of said film to a predetermined processing comprising, in combination, casing means for enclosing elements of said apparatus, framing means for positioning said film for photographic exposure, means for photographically exposing said film, a pair of pressure applying members mounted adjacent that end of said framing means from which said film is adapted to advancement after exposure, said pressure applying members comprising portions between which said films and another sheet material are adapted to be positioned, in superposed relationship, advanced, and subjected to compression, means for mounting a roll of unexposed film adjacent that end of said framing plate which is opposite the aforesaid end thereof, means for mounting a roll of said other sheet material adjacent said pressure applying members, means comprising a fluid dispenser normally holding a supply of film processing fluid, sufficient for processing a plurality of frames of exposed film, out of contact with said materials and adapted to dispense said fluid to said materials, means for actuating said dispenser means for dispensing said fluid therefrom, means forming a light-tight chamber for holding said compressed materials therewithin for a predetermined period, to complete processing of said film, means providing access to said chamber for removal of materials therefrom, and means for establishing relative position and register of said materials and dispensed quantities of said fluid within said apparatus, so that said fluid may be dispensed for positioning adjacent an edge of an exposed area of film, and may subsequently be spread throughout said area.

EDWIN H. LAND.

REFERENCES CITED

The following references are of record in the file of this patent:

UNITED STATES PATENTS

| Number | Name | Date |
|---|---|---|
| 1,424,816 | Grillone | Aug. 8, 1922 |
| 1,683,931 | Pifer | Sept. 4, 1928 |
| 2,287,742 | Mandel | June 23, 1942 |
| 2,308,530 | McManus | Jan. 19, 1943 |

Certificate of Correction

Patent No. 2,435,719 — February 10, 1948

EDWIN H. LAND

It is hereby certified that errors appear in the printed specification of the above numbered patent requiring correction as follows:

Column 19, line 26, for the word "therewith" read *therewithin*; column 20, line 60, for "films" read *film*; column 22, line 9, list of references cited, for the patent number "1,683,931, read *1,682,931*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*